(12) United States Patent
Risch (10) Patent No.: US 11,548,610 B2
(45) Date of Patent: Jan. 10, 2023

(54) AIRCRAFT DOOR, AIRCRAFT REGION AND AIRCRAFT WITH AN AIRCRAFT DOOR

(71) Applicant: Airbus Operations GmbH, Hamburg (DE)

(72) Inventor: Ronald Risch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 715 days.

(21) Appl. No.: 16/555,283

(22) Filed: Aug. 29, 2019

(65) Prior Publication Data
US 2020/0070946 A1 Mar. 5, 2020

(30) Foreign Application Priority Data

Aug. 31, 2018 (DE) .................... 10 2018 121 305.0

(51) Int. Cl.
| | | |
|---|---|---|
| B64C 1/14 | (2006.01) | |
| E05D 5/06 | (2006.01) | |
| E05D 15/56 | (2006.01) | |
| E05D 11/10 | (2006.01) | |
| E05F 5/00 | (2017.01) | |

(52) U.S. Cl.
CPC ............ *B64C 1/143* (2013.01); *B64C 1/1461* (2013.01); *E05D 5/062* (2013.01); *E05D 11/10* (2013.01); *E05D 15/56* (2013.01); *E05F 5/00* (2013.01); *E05Y 2900/502* (2013.01); *E05Y 2900/531* (2013.01); *Y10T 16/547* (2015.01)

(58) Field of Classification Search
CPC ....... B64C 1/143; B64C 1/1461; E05D 5/062; E05D 3/127; E05D 3/147; E05D 11/10; E05D 11/1007; E05D 15/56; E05F 5/00; E05Y 2900/502; E05Y 2900/531; E05Y 2201/224; E05Y 2201/22; Y10T 16/551; Y10T 16/547; Y10T 16/5478; Y10T 16/54; Y10T 16/5403; Y10T 16/61
USPC ....... 244/119, 129.5; 16/374, 366, 371, 319, 16/337, 82
See application file for complete search history.

(56) References Cited

U.S. PATENT DOCUMENTS

| | | | | |
|---|---|---|---|---|
| 3,016,261 A | * | 1/1962 | Tatter | E05D 3/127 49/246 |
| 4,726,146 A | * | 2/1988 | Opsahl | B64C 1/1407 16/349 |
| 4,854,010 A | * | 8/1989 | Maraghe | B64C 1/1407 49/248 |
| 5,289,615 A | * | 3/1994 | Banks | B64C 1/143 244/905 |
| 6,834,834 B2 | * | 12/2004 | Dazet | B64C 1/143 244/129.4 |

(Continued)

FOREIGN PATENT DOCUMENTS

| | | | | |
|---|---|---|---|---|
| CA | 2643311 A1 | * | 9/2007 | ........... B64C 1/1415 |
| DE | 258591 A1 | | 7/1988 | |
| DE | 102015224449 A1 | | 6/2017 | |

*Primary Examiner* — William L Miller
(74) *Attorney, Agent, or Firm* — Greer, Burns & Crain, Ltd.

(57) ABSTRACT

An aircraft door, an aircraft region and an aircraft with an aircraft door. The aircraft door through which passengers enter and leave the aircraft and is held towards the outer side by stops and is locked exclusively on a hinge side opposite the stops. Also, an aircraft region and an aircraft with such an aircraft door.

15 Claims, 3 Drawing Sheets

(56) References Cited

U.S. PATENT DOCUMENTS

| | | | |
|---|---|---|---|
| 10,240,389 B2* | 3/2019 | Do | B64C 1/1461 |
| 2017/0089124 A1* | 3/2017 | Do | E06B 5/12 |
| 2017/0158305 A1 | 6/2017 | Werthmann | |
| 2020/0300013 A1* | 9/2020 | Chadwell | E05D 11/1057 |
| 2021/0070416 A1* | 3/2021 | Buchet | E05C 9/08 |
| 2021/0310290 A1* | 10/2021 | Beezhold | B64C 1/143 |
| 2021/0323654 A1* | 10/2021 | Gildas | E05D 15/28 |
| 2021/0332624 A1* | 10/2021 | Means | E05D 3/18 |
| 2021/0387713 A1* | 12/2021 | Dubose | B64C 1/1438 |

* cited by examiner

AIRCRAFT DOOR, AIRCRAFT REGION AND AIRCRAFT WITH AN AIRCRAFT DOOR

CROSS-REFERENCES TO RELATED APPLICATIONS

This application claims priority from German Patent Application No. 10 2018 121 305.0 filed Aug. 31, 2018, the entirety of which is incorporated herein by reference.

FIELD OF THE INVENTION

The invention relates to an aircraft door, an aircraft region and an aircraft with an aircraft door. In particular, the invention relates to an aircraft door through which passengers can enter and leave the aircraft and which is held towards the outer side by stops and is locked exclusively on an opposite hinge side. Furthermore, the invention relates to an aircraft region and an aircraft in each case with such an aircraft door.

BACKGROUND OF THE INVENTION

During the closing of an opening in the aircraft outer skin, conventional aircraft doors are customarily placed onto the opening (by parallel displacement) and are subsequently moved downwards in order to bring door stops on at least two sides of the door or door frame into an overlapping position such that the door cannot be pushed open outwards. In addition, a lock at least on a side of the door or the door frame opposite a hinge is actuated in order to lock the door.

In order to open said aircraft doors manually, large forces have to be applied, in particular in order to move the aircraft door upwards so as to bring the door stops into a free position. Hand levers and an associated mechanism and/or motor drives are necessary for this purpose.

In the event of an accident of the aircraft, the door frame may be displaced, and therefore the aircraft door can be difficult to open, if it can be opened at all. In particular, displacement of the door frame may cause a door stop to possibly not pass into a free position during the raising of the door, or the freedom of movement for raising the door is already blocked.

The invention is based on an object of providing an aircraft door which securely closes an opening in an outer skin of an aircraft, but at the same time can easily be opened and has a simple design. Furthermore, an aircraft region and an aircraft with such an aircraft door are to be provided.

SUMMARY OF THE INVENTION

This object may be achieved by an aircraft door with the features of one or more embodiments described herein, by an aircraft region with the features of one or more embodiments described herein, and by an aircraft with the features of one or more embodiments described herein.

According to a first aspect, an aircraft door which, on the periphery, has a hinge side, an opposite stop side and free sides lying in between comprises a door wing which is configured to close an opening in an outer skin of an aircraft, and a door frame which, at least in sections, surrounds the opening in the outer skin of the aircraft. The term "on the periphery" should be understood here with regard to the door wing which, on its narrow, outer, encircling sides, has a hinge side, a stop side and free sides lying in between. With regard to the door frame, the corresponding sides directed inwards (when the door is closed) onto the door wing are meant here. Furthermore, the peripheral sides of the door wing define the outer boundary of an outer surface and of an inner surface of the door wing. The door frame can include primary structural components of the aircraft. For example, a frame can in each case form a lateral door frame while a stringer in each case forms the door sill and the door lintel.

The aircraft door furthermore comprises a bent articulated arm which is arranged on the hinge side of the aircraft door, wherein a first end of the articulated arm is connected rotatably to the door wing and a second end of the articulated arm is connected rotatably to the door frame on the hinge side of the aircraft door. The hinge side of the aircraft door can be any desired side of the aircraft door. For example, it can be the side of the aircraft door (of the door frame) positioned at the front in the longitudinal direction (direction of travel) of the aircraft or the side of the aircraft door positioned at the rear. It is also conceivable for the hinge side to lie on an upper or lower side of the aircraft door (of the door frame).

Finally, the aircraft door comprises a door stop which is attached on the stop side and is configured to hold the door wing in a direction substantially perpendicular to a main plane of the door wing and towards an outer side of the aircraft, and a lock arranged exclusively on the hinge side of the aircraft door. The aircraft door is therefore fastened on one side (the hinge side) to the aircraft fuselage by means of the articulated arm while only a door stop is provided on the opposite side (the stop side), in order to prevent the door from opening in a manner directed outwards. "Main plane of the door wing" is understood here as meaning a plane which is defined by the door sill and the door lintel or by the stop side and hinge side. The main plane is therefore oriented substantially parallel to a longitudinal axis of the aircraft. Since the fuselage of an aircraft is generally cylindrical, the main plane of the door wing is not intended to be understood here exclusively as a flat plane, but also includes a curved surface which constitutes a section of the cylinder of the aircraft fuselage. In this case, perpendicular to the main plane or to said curved surface means in the radial direction of the cylinder section, i.e. perpendicular to the curved surface at the corresponding point of the surface. In the event that the aircraft door is arranged in a region of the aircraft having a conical profile (for example in the nose or tail region of the aircraft), the main plane (curved surface) does not lie parallel to the longitudinal axis of the aircraft. However, perpendicular to the main plane continues to mean here perpendicular to the outer skin of the aircraft at the corresponding considered point of the aircraft door.

The aircraft door can be held on the hinge side by an individual articulated arm and can therefore be opened and closed. The articulated arm can have a corresponding height (vertical extent in the peripheral direction of the door frame or door wing) in order to absorb the loads of the door wing and to move the door wing securely into the opening of the aircraft outer skin.

Similarly, an individual door stop can be arranged on the stop side. Said door stop can have a height (vertical extent in the peripheral direction of the door frame or door wing) which corresponds to conventional door stops for aircraft. Since, however, the door stop is designed to hold the door wing primarily in a direction substantially perpendicular to the main plane of the door wing and towards an outer side of the aircraft, a higher door stop can also be used. For example, the door stop can have a height greater than 50 mm, greater than 75 mm or greater than 100 mm. The height of the door stop can also take up a third or half of the height of the door wing (or of the door frame) or (virtually) the entire height of the door wing (or of the door frame) along the stop side. As a result, the load input of the door stop is distributed over a greater length, and therefore the door stop and the associated fastening means on the door wing and door frame can be configured to be smaller and lighter. Of course, a plurality of articulated arms and/or a plurality of door stops can be arranged on the hinge side or the stop side. The door stops here can likewise have the heights which are described for an individual door stop and which exceed the height of a conventional door stop.

By means of the lock arranged exclusively on the hinge side, the locking mechanism of the aircraft door is simplified overall. For example, a locking mechanism arranged in the wing can be dispensed with. In addition, the design of the door with an articulated arm on the hinge side and door stop on the opposite side makes it possible for a lock on the hinge side to suffice since the door can be locked there by blocking the rotational moments of the articulated arm on the door frame and/or of the door wing on the articulated arm. On the opposite side, the door stop prevents the door from being opened. The door wing thereby also becomes lighter.

In one variant refinement of the aircraft door, the door stop has a first stop element arranged on the door frame on the stop side and a second stop element arranged on the door wing on the stop side. The first stop element has a first stop surface which runs obliquely into the aircraft interior in a direction from the stop-side door frame into the opening surrounded by the door frame, and the second stop element has a second stop surface which runs obliquely away from the aircraft interior in a direction from the door wing to the stop-side door frame when the aircraft door is closed, wherein the first and second stop surface lie on each other in the closed state of the aircraft door. The stop surfaces are therefore oblique to a main plane of the door wing (this is true for both stop surfaces when the door is closed). In other words, the stop surfaces (when the door is closed) are oblique to a cross-sectional plane of the aircraft and have an intercepting axis with the cross-sectional plane of the aircraft. The cross-sectional plane of the aircraft is perpendicular to the longitudinal axis and lies parallel to the transverse axis of the aircraft. "Obliquely" is understood here as meaning a deviation of the course of the stop surfaces from the main plane of the door wing or from a perpendicular to the cross-sectional plane of the aircraft within a range of 1° to 15°, preferably 2° to 8° and in particular 5°.

In order to permit overlapping of the stop surfaces, the first stop element and the second stop element each have an extension, on which extensions the respective first and second stop surfaces are formed. The stop surfaces which are arranged in such a manner and lie on each other when the door is closed hold the door wing (primarily) in the direction substantially perpendicular to the main plane of the door wing or main plane of the door frame when the aircraft door is closed. In order to hold the door wing only towards an outer side of the aircraft, the first stop element lies closer towards the outer skin of the aircraft than the second stop element of the door wing when the aircraft door is closed. In other words, the stop surface of the first stop element points into the aircraft interior while the second stop surface of the second stop element points outwards (when the aircraft door is closed).

Alternatively or additionally, at least one of the first and second stop surfaces can be arranged in the door frame or in the interior of a structure of the door wing. For example, the door frame can have an opening and depression in which the first stop surface is arranged, wherein an extension on the door wing, said extension forming the second stop element, projects through the opening into the depression. Conversely, an extension with a first stop surface can also be provided on the door frame, said extension projecting into a corresponding opening and depression in the door wing, and therefore a second stop surface arranged there and the first stop surface lie on each other when the aircraft door is closed. This permits a more compact design of the door wing and/or of the door frame, wherein an outer skin of the aircraft has to protrude less far over the door frame or over the door wing and is therefore held more stably by the door frame or by a structural element of the door wing.

In addition, the stop surfaces which each run obliquely have the advantage that a compressive force on the door wing from the interior of the aircraft can slide the second stop surface on the first stop surface and, in the process, moves the door wing closer to the stop-side door frame. In other words, a closed position of the two stop elements is reinforced. Such a pressure on the door wing can arise, for example, by means of a passenger or an object which falls/presses against the inner side of the door wing. This pressure can also be brought about by the increased internal pressure in relation to a lower pressure prevailing in the outer surroundings of the aircraft.

In a further variant embodiment, the bent articulated arm can be configured so as, upon rotation about the second end, to reach an open position in which the bent articulated arm engages around an edge of the outer skin of the aircraft, said edge forming the opening, and at least a hinge-side region of the door wing arranged at the first end of the bent articulated arm lies on an outer side of the aircraft. In other words, the inner side of the curvature of the bent articulated arm points towards the outer skin of the aircraft, but (in the open position) partially points towards the inner side of the outer skin, to the edge thereof forming the opening and towards the outer side of the outer skin. A part of the bent articulated arm that comprises the second end of the articulated arm, which end is connected to the door frame, is located on an inner side of the outer skin in the open position while the first end of the articulated arm, which end is connected to the door wing, is located on an outer side of the outer skin. In a closed position of the bent articulated arm, the first end of the articulated arm and that portion of the door wing which is arranged in an articulated manner thereon lie in the aircraft interior. An outer side of the door wing lies here in a plane with the outer skin of the aircraft. In the event of a curved outer skin of the aircraft, the door wing also has a curved outer side, and therefore the outer side of the door wing and the outer skin of the aircraft are aligned, i.e. permit a stepless outer side of the aircraft.

In a development of the aircraft door, in the open position, the bent articulated arm can move the door wing away from the stop-side door frame, as a result of which the door wing can rotate freely about the first end of the articulated arm. Since the articulated connection of the door wing to the first end of the articulated arm rotates on a circular path about the second end of the articulated arm, with increasing rotation about the first end of the articulated arm the door wing is moved to an increasingly greater extent in the longitudinal direction of the aircraft. As a result, the second stop surface of the second stop element can slide on the first stop surface of the first stop element or can carry out a movement parallel to the first stop surface without touching the first stop surface until the two stop surfaces no longer rest on each other. At this moment, the stop-side end of the door wing is free and the door wing can rotate freely about the first end of the articulated arm.

This special design of the aircraft door furthermore makes it possible to dispense with lowering or raising of the door during the closing and during the opening. The second stop element can be released from the first stop element solely by means of the rotational movement of the articulated arm, in order to permit opening of the door. During the closing of the door, the door wing can be moved into the aircraft interior to such an extent that the stop surfaces of the first and second stop element can be brought into a position resting on each other. This movement into the aircraft interior can take place either manually by means of a person closing the door or by means of a drive which can rotate the door wing about the first end of the articulated arm. Only when the second stop surface of the door-wing-side second stop element lies somewhat further in the aircraft interior than the first stop surface of the door-frame-side first stop element is the aircraft door intended to be closed, by rotation of the articulated arm about the second end.

By means of this movement and the now no longer necessary lowering or raising of the door during the closing and during the opening, the arrangement of stop elements with a height greater than in the case of conventional door stops is possible. In particular, the height of the stop elements can now be selected to be greater than the hitherto conventional lift of the door wing. As a result, the loads of the door stops can be distributed into the door frame or the door wing over a greater region. In addition, the stop elements can be configured more simply. For example, simple L profiles can be used for the stop elements on the door-frame side and door-wing side. Costs and weight for the types of aircraft can therefore be saved.

In a further variant refinement, the aircraft door can furthermore comprise a fitting which is arranged on the door frame on the stop side and has a receptacle, and a sliding extension which is arranged on the door wing on the stop side and is configured to slide into the receptacle of the fitting during the closing of the aircraft door. Said fitting and sliding extension permit a permanently error-free closing of the aircraft door, in particular the fitting and the sliding extension prevent the first and second stop element from being brought into a position in which the first and second stop surfaces do not rest on each other and can slide or cannot carry out any contact-free parallel movement. The fitting and sliding extension therefore form a guide for the door wing.

In one development, the sliding extension can have a roller which is rotatable about a pivot point and the outer periphery of which corresponds to a shape of the receptacle of the fitting. By means of this form-fitting connection, secure closing of the aircraft door is possible. In addition, the receptacle of the fitting can also hold the door wing in the direction of the aircraft interior and/or in a direction substantially parallel to the longitudinal axis of the aircraft.

In a further variant refinement, the lock can have a first locking element, which is fastened rotatably to the hinge-side door frame, and a second locking element, which is articulated on the bent articulated arm between the first and second end of the articulated arm. The first locking element is coupled rotatably here to the second locking element via a joint. By means of the joint, the lock does not obstruct the movement of the bent articulated arm between its open position and closed position, but rather the first and second locking element can be rotated in relation to each other during the movement of the articulated arm. The first locking element can also be fastened on the hinge side to a different stationary element than to the door frame. For example, the first locking element can be fastened to an inner side of the outer skin of the aircraft or can be fastened to an element provided separately for this purpose.

In one development, the lock can be configured to move the joint between the first and second locking element into a position in which the joint is at a distance from a connecting line which connects a pivot point of the first locking element on the hinge-side door frame to a pivot point of the second locking element on the bent articulated arm, wherein the position of the joint lies in the direction of the hinge-side door frame. The joint between the first and second locking element can take up this position in particular when the bent articulated arm is in its closed position.

Since the pivot point of the second locking element on the bent articulated arm moves away from the hinge-side door frame for the opening (i.e. during the movement to the open position of the articulated arm), an angle between the first and second locking element in the joint would have to become smaller, as a result of which the joint would have to move closer towards the door frame. This movement of the joint, and therefore of the first and second locking element, can be restricted by a stop for the joint, and therefore, in the spaced-apart position, the joint cannot move further towards the door frame.

For the opening of the aircraft door, the lock has to be unlocked. For this purpose, the joint is moved onto that side of the connecting line which faces away from the door frame (i.e. is moved away from the stop). As a result, the first and second locking element can move in such a manner that the angle between the first and second locking element in the joint is reduced, but this time on that side of the connecting line which faces away from the door frame. In other words, the first and second locking elements do not obstruct the movement of the bent articulated arm. This brings about efficient locking of the aircraft door by restricting the movement of the bent articulated arm. In order to move the joint onto that side of the connecting line which faces away from the door frame or, conversely, in order to move the joint onto that side of the connecting line which faces the door frame, it is possible to provide a lever which is to be actuated manually or a mechanical drive which moves the joint over the connecting line, i.e. over the dead center of the connecting elements connected in an articulated manner.

In a further refinement, the aircraft door can furthermore comprise a seal which is arranged on an inner side of the aircraft along an outer edge of the door wing. In addition, a further sealing element or a sealing stop, which sealing element/sealing stop is directed towards an inner side of the aircraft, can be provided on the door-frame side, for example on an edge of the outer skin, which edge forms the opening. The sealing between the outer skin of the aircraft and the outer side of the door wing therefore takes place on the inside, as a result of which the movement of the door wing brought about by the bent articulated arm is not obstructed.

According to a further aspect, an aircraft region comprises an aircraft door according to the first aspect or according to one of its variant refinements or developments.

According to yet another aspect, an aircraft comprises at least one aircraft door according to the first aspect or according to one of its variant refinements or developments.

The aspects, developments, refinements and variants described here can be combined as desired, and therefore further variant refinements which are not explicitly described are included in the present disclosure.

BRIEF DESCRIPTION OF THE DRAWINGS

Exemplary embodiments of the invention will be described in more detail below with reference to the drawings.

DETAILED DESCRIPTION OF THE PREFERRED EMBODIMENTS

The present invention describes an aircraft door with a hinge attached on the stop side and, opposite the latter, a hinge which is attached on the hinge side and has a lock. Furthermore, an aircraft region and an aircraft with such an aircraft door are described.

Figure 1:
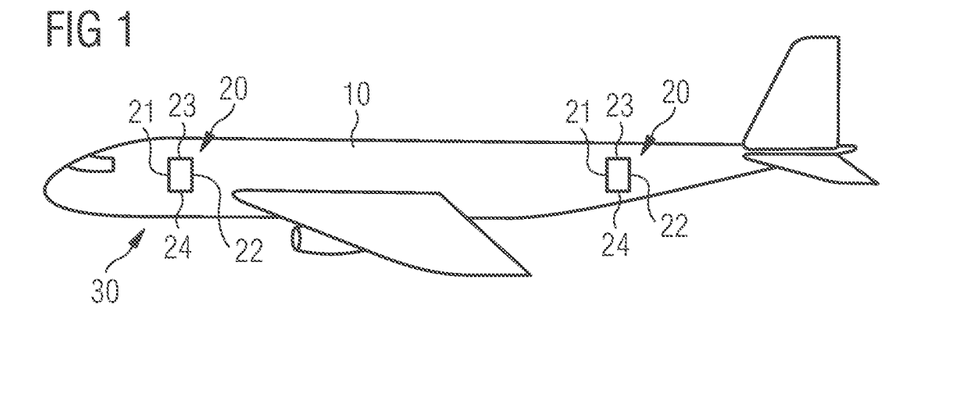
FIG. 1 shows schematically a perspective illustration of an aircraft and of an aircraft region with an aircraft door.

FIG. 1 shows schematically a perspective illustration of an aircraft 10 and of an aircraft region 30 with an aircraft door 20. The aircraft door 20 has different sides, of which one is designed as a hinge side 21. The hinge side 21 can thus be a side of the aircraft door 20 lying at the front in the direction of travel (longitudinal direction) of the aircraft 10. Opposite the hinge side 21 there is a stop side 22, while the two upper and lower free sides 23, 24 lying in between form a door sill and door lintel. The hinge side 21 can also be located on one of the other sides 22 to 24, wherein the hinge stop side 22 is furthermore arranged opposite the hinge side 21.

Figure 2:
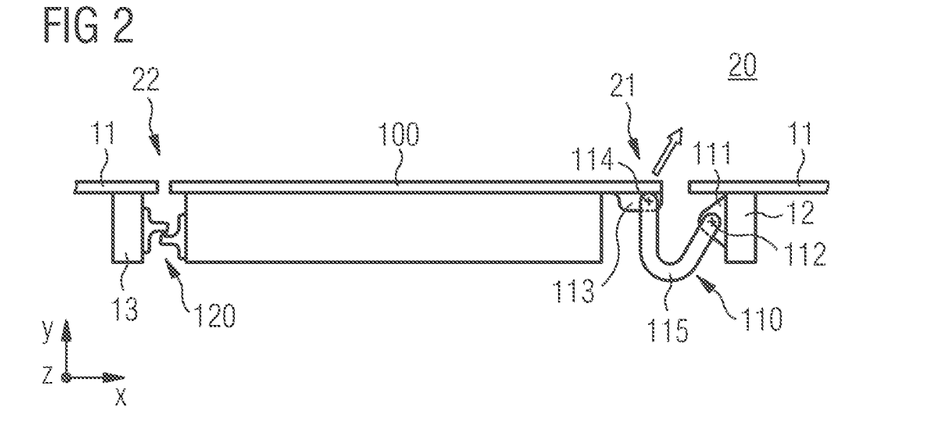
FIG. 2 shows schematically a cross section of an aircraft door in the closed state.

The aircraft door 20 closes an opening 14 (FIG. 6), as is illustrated schematically in the cross section in FIG. 2. In detail, the aircraft door 20 comprises a door wing 100 which is configured to close the opening 14 in an outer skin 11 of an aircraft 10. The opening 14 of the outer skin 11 is formed here, at least in sections, by a door frame 12, 13. A hinge 110 is provided on the hinge side 21, and therefore the door wing 100 can move out of the opening 14. For this purpose, the hinge 110 has a bent articulated arm 115 which is arranged on the hinge side 21 of the aircraft door 20, wherein a first end 114 of the articulated arm 115 is connected rotatably to the door wing 100 and a second end 112 of the articulated arm 115 is connected rotatably to the door frame 12 of the hinge side 21 of the aircraft door 20. For the connection of the second end 112 of the articulated arm 115 to the door frame 12, a projection 111 can be provided which forms part of a hinge for the second end 112 of the articulated arm 115. Similarly, a projection 113 can also be provided on the door wing 100, which projection forms part of a joint for the first end 114 of the articulated arm 115.

A door stop 120 is provided on the opposite stop side 22 of the aircraft door 20. The door stop 120 can be configured to hold the door wing 100 (primarily) in a direction substantially perpendicular to a main plane of the door wing 100 and towards an outer side of the aircraft 10. In FIG. 2, the main plane of the door wing 100 lies parallel to the longitudinal direction (X axis) of the aircraft 10 while a direction perpendicular to the main plane lies substantially parallel to a transverse axis (Y axis) of the aircraft 10.

Figure 3:
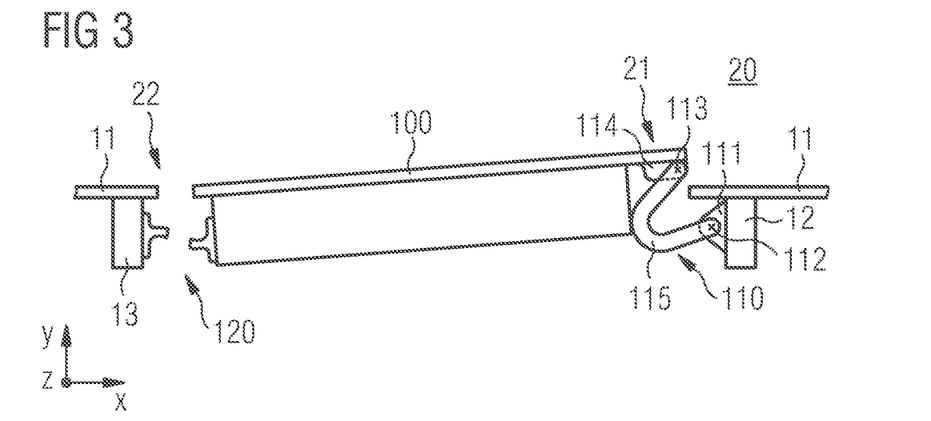
FIG. 3 shows schematically a cross section of the aircraft door from FIG. 2 in an opening state.

FIG. 3 shows schematically that the bent articulated arm 115 is configured so as to reach an open position during rotation about the second end 112. In said open position, the bent articulated arm 115 engages around an edge of the outer skin 11 of the aircraft 10, said edge forming the opening 14. In this case, at least a hinge-side region of the door wing 100 arranged at the first end 114 of the bent articulated arm 115 lies on an outer side of the aircraft 10. During this movement into the open position of the bent articulated arm 115, the hinge-side portion of the door wing 100 arranged at the first end 114 of the articulated arm 115 is also moved in the direction of the longitudinal direction of the aircraft 10 (to the right in FIG. 3). By means of this movement in the direction of the longitudinal direction of the aircraft 10 (X axis), the door stop 120 can be opened. This releases the door wing 100 on the stop side, as a result of which the door wing 100 can rotate freely about the first end 114 of the articulated arm 115.

Figure 4:
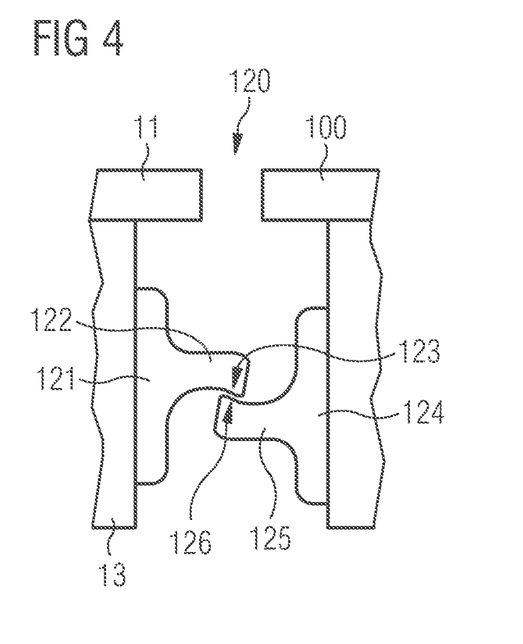
FIG. 4 shows schematically a cross section of a door stop in the closed state.

In this regard, FIG. 4 shows schematically a cross section of the door stop 120 in the closed state. The door stop 120 has a first stop element 121 arranged on the door frame 13 on the stop side and a second stop element 124 arranged on the door wing 100 on the stop side. The first stop element 121 has a first stop surface 123 which runs obliquely into the aircraft interior in a direction from the stop-side door frame 13 into the opening 14 surrounded by the door frame 12, 13. The outermost free end of the first stop element 121 therefore lies further in the aircraft interior than a portion of the first stop element 121 located closer to the door frame 13. Similarly, the second stop element 124 has a second stop surface 126 which runs obliquely away from the aircraft interior in a direction away from the door wing 100 when the aircraft door 20 is closed. In other words, the outermost free end of the second stop element 124 lies further away from the aircraft interior (closer to the outer skin 11) than a portion of the second stop element 124 that is located closer to the door wing 100. At least one of the stop surfaces 123, 126 can optionally be formed on a corresponding extension 122, 125. By means of the oblique arrangement of the stop surfaces 123, 126, in the event of a pressure (in the event of a force) on the door wing 100 outwards from the aircraft interior, a sliding movement of the second stop surface 126 on the first stop surface 123 can be caused, said sliding movement moving the second stop surface 126 and therefore the door wing 100 closer to the door frame 13 (to the left in FIG. 4). This reinforces the closing of the door wing 100 on the stop side 22 of the aircraft door 20.

Figure 5:
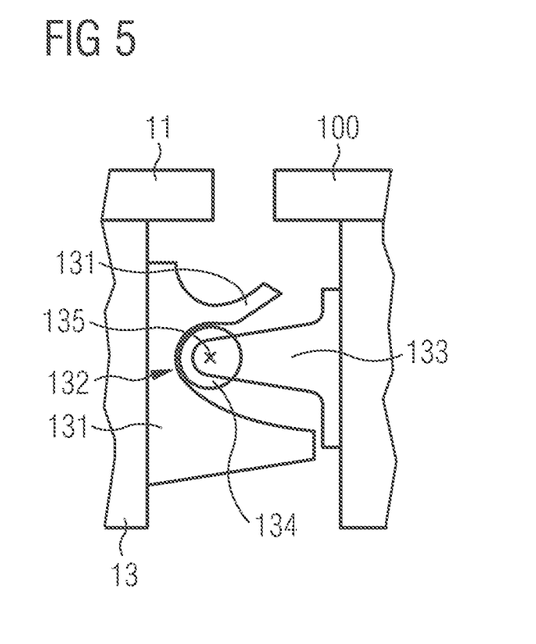
FIG. 5 shows schematically a cross section of a fitting in the closed state.

The aircraft door 20 can optionally comprise a fitting 131, as is illustrated schematically in cross section in FIG. 5 in the closed state of the aircraft door 20. The fitting 131 can be arranged on the door frame 13 on the stop side and can have a receptacle 132. A corresponding sliding extension 133 which is arranged on the door wing 100 on the stop side is configured to slide into the receptacle 132 of the fitting 131 during the closing of the aircraft door. In order to facilitate the sliding, the sliding extension 133 can have a roller 134 which is rotatable about a pivot point 135 and the outer circumference of which corresponds to an inner shape of the receptacle 132 of the fitting 131. By means of the movement of the roller 134 along the receptacle 132, the door wing 100 can be controlled/guided in such a manner that the stop surfaces 123, 126 come to rest/lie on each other during the closing of the aircraft door 20. The receptacle 132 can have extensions which extend away from the door frame 13. Said extensions serve as a guide of the sliding extension 133 and therefore of the door wing 100 during the opening and closing, and in particular while the stop surfaces 123, 126 are in an overlapping position. The two extensions of the receptacle 132 can have rectilinear sides aligned with each other and/or expanding sides aligned with each other. By means of the widening sides, better guidance of the door wing can be achieved since the extensions of the receptacle 132 "trap" the sliding extension 133 and conduct same into the end position closest to the door frame 13.

Figure 6:
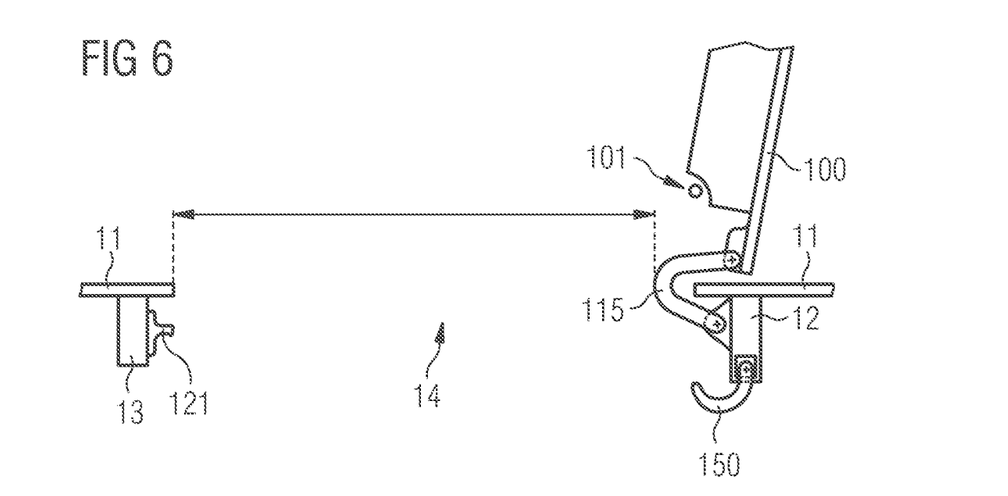
FIG. 6 shows schematically a cross section of the aircraft door from FIG. 2 in an open state.

FIG. 6 finally shows schematically a cross section of the aircraft door 20 from FIG. 2 in an open state. By means of the rotational movement of the bent articulated arm 115 to the open position, illustrated in FIG. 3, the second stop element 124, which is connected to the door wing 100, no longer overlaps with the first stop element 121. As a result, the door wing 100 can rotate about the first end 114 of the articulated arm 115, as a result of which the opening 14 is completely opened up. Since the articulated arm 115 engages around an edge of the outer skin 11 of the aircraft 10, the opening 14 is only slightly smaller than as far as the edge of the outer skin 11. A sufficient passage width for the entry and exit of passengers into and out of the aircraft is therefore reliably ensured.

FIG. 6 furthermore shows an optional lock 150. The lock 150 can be designed in the form of a rotatable hook 150. The latter can interact with a corresponding bolt 101 on the door wing 100. For example, the hook 150 can engage around the bolt 101 when the door wing 100 is in a closed position (FIG. 2). The door wing 100 is thereby fixed on the hinge side, as a result of which a movement of the bent articulated arm 115 is also prevented. Since, in the closed position of the door wing 100, the door stop takes up the position illustrated in FIG. 4, the lock 150 overall prevents opening of the aircraft door 20.

Figure 7:
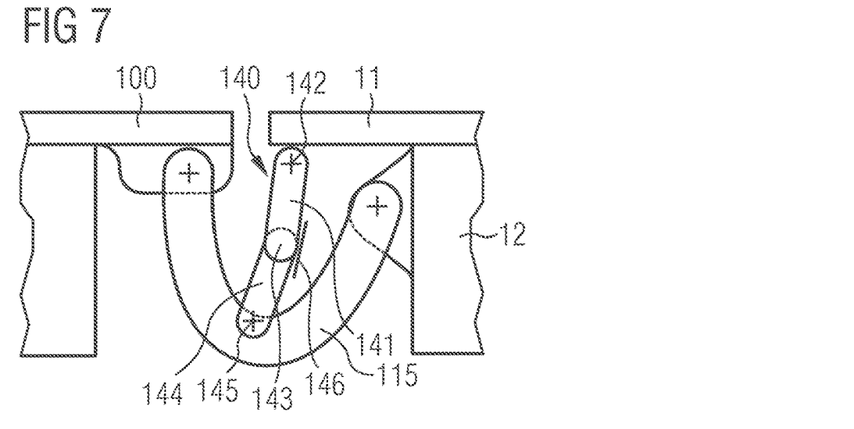
FIG. 7 shows schematically a cross section of a hinge with a lock in the closed state.
Figure 8:
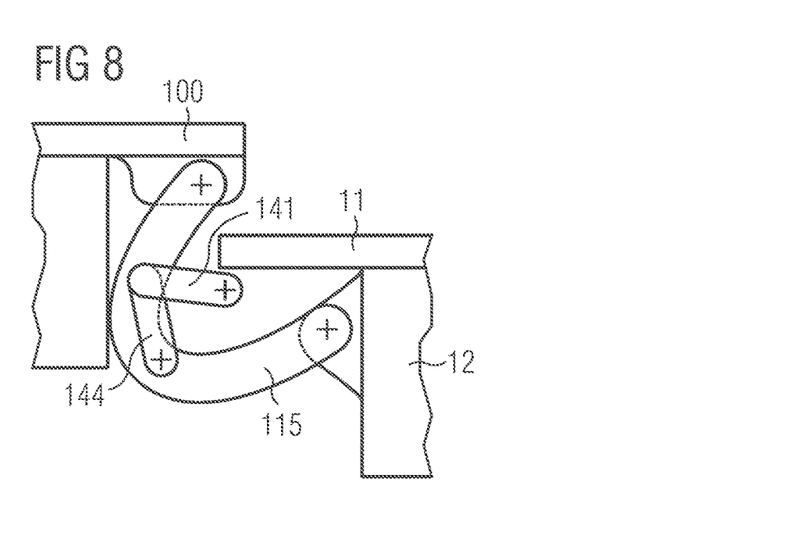
FIG. 8 shows schematically a cross section of the hinge from FIG. 7 in the open state.

A further optional lock 140 is illustrated schematically in cross section in FIGS. 7 and 8. FIG. 7 shows the lock 140 in the closed state and FIG. 8 shows same in the open state. The lock 140 comprises a first locking element 141, which is fastened rotatably on the hinge-side door frame 12 and/or to the outer skin 11 of the aircraft 10 and/or to another primary structural element of the aircraft 10, said primary structural element being adjacent to the aircraft door 20, and a second locking element 144, which is articulated on the bent articulated arm 115 between the first and second end 114, 112. The primary structural element of the aircraft 10 that is adjacent to the aircraft door 20 can be, for example, the projection 111, but also a different primary structural element, such as, for example, a stringer arranged in this region. The two locking elements 141, 144 are themselves coupled rotatably via a joint 143.

In order then to lock the hinge 110 or the door wing 100, the first locking element 141 and/or the second locking element 144 and/or the joint 143 is moved manually or mechanically into the position shown in FIG. 7. In this position, the joint 143 is spaced apart in the direction of the hinge-side door frame 12 from a connecting line which connects a pivot point 142 of the first locking element 141 on the hinge-side door frame 12 to a pivot point 145 of the second locking element 144 on the bent articulated arm 115. In other words, the joint lies on a side of the connecting line facing the hinge-side door frame 12.

If it is then attempted to rotate the articulated arm 115 about the pivot point at the second end 112 into its open position, the second locking element 144 would have to rotate at the joint 143 relative to the first locking element 144. In the process, the joint 143 would first of all move further in the direction of the hinge-side door frame. In order to prevent this movement, a stop 146 is provided. The locking element 140 therefore locks a movement of the articulated arm 115.

In order then to open the door wing 100, the first locking element 141 and/or the second locking element 144 and/or the joint 143 is moved manually or mechanically in such a manner that the joint 143 is located on the opposite side of the connecting line, i.e. on that side of the connecting line which faces away from the hinge-side door frame 12. The articulated arm 115 can then be moved from its closed position into its open position, as a result of which the first and second locking element 141, 144 can take up the position illustrated in FIG. 8.

Figure 9:
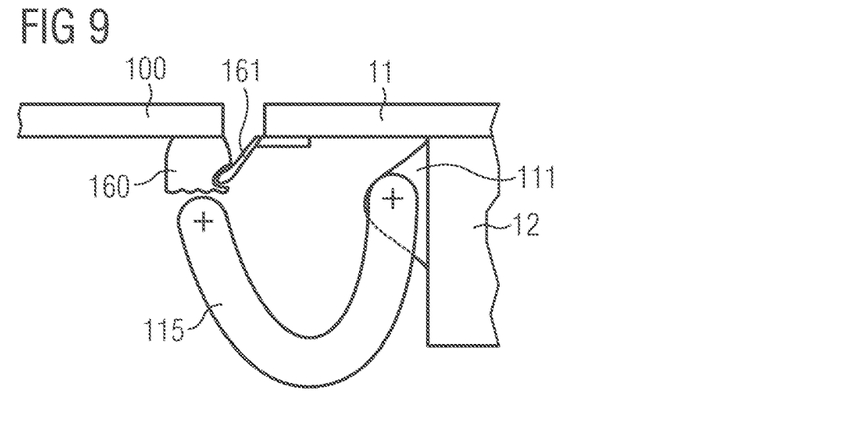
FIG. 9 shows schematically a cross section of a hinge with a seal in the closed state.

FIG. 9 shows schematically a cross section of a hinge 110 with a seal 160 in the closed state of the door wing 100. The seal 160 lies here on an inner side of the aircraft 10 along an outer edge of the door wing 100. In order not to obstruct the movement caused by the articulated arm 115, a further sealing element arranged on the door-frame side, for example on an edge of the outer skin 110, which edge forms the opening 14, or a sealing stop 161 is provided. The sealing stop 161 is fastened here to the outer skin 11 and/or to the hinge-side door frame 12 in such a manner that the seal 160 can slide there along while the bent articulated arm 115 moves from its closed position into the open position. Furthermore, the sealing stop 161 can have a widened portion at its end remote from the outer skin 11. Secure lying of the seal 160 against the sealing stop 161 can thereby be ensured.

The above-explained variants, refinements and exemplary embodiment serve merely for describing the claimed teaching, but do not restrict the latter to the variants, refinements and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft door which, on the periphery, has a hinge side, an opposite stop side, and free sides lying in between, wherein the aircraft door comprises:
  a door wing which is configured to close an opening in an outer skin of an aircraft;
  a door frame which, at least in sections, surrounds the opening in the outer skin of the aircraft;
  a bent articulated arm, which is arranged on the hinge side of the aircraft door, wherein a first end of the articulated arm is connected rotatably to the door wing and a second end of the articulated arm is connected rotatably to the door frame on the hinge side of the aircraft door;
  a door stop which is attached on the stop side and is configured to hold the door wing in a direction substantially perpendicular to a main plane of the door wing and towards an outer side of the aircraft; and a lock arranged exclusively on the hinge side of the aircraft door, the lock configured to selectively block rotational movements of the articulated arm on the door frame, or the door wing on the articulated arm, or both.

2. The aircraft door according to claim 1, wherein the door stop has a first stop element arranged on the door frame on the stop side and a second stop element arranged on the door wing on the stop side,
wherein the first stop element has a first stop surface which runs obliquely into the aircraft interior in a direction from the stop-side door frame into the opening surrounded by the door frame, and
wherein the second stop element has a second stop surface which runs obliquely away from the aircraft interior in a direction away from the door wing when the aircraft door is closed,
wherein the first and second stop surface lie on each other in the closed state of the aircraft door.

3. The aircraft door according to claim 2, wherein the first stop element and the second stop element each have an extension, on which extensions the respective first and second stop surfaces are formed.

4. The aircraft door according to claim 2, wherein the first stop element, the second stop element, or both have a height which extends in the peripheral direction of the door wing and is greater than 50 mm.

5. The aircraft door according to claim 2, wherein the first stop element, the second stop element, or both have a height which corresponds to a third or to half of a height of the door wing or substantially to the entire height of the door wing.

6. The aircraft door according to claim 2, wherein the door stop has a multiplicity of first stop elements arranged on the door frame on the stop side, a multiplicity of second stop elements arranged on the door wing on the stop side, or both.

7. The aircraft door according to claim 1, wherein the bent articulated arm is configured so as, upon rotation about the second end, to reach an open position in which the bent articulated arm engages around an edge of the outer skin of the aircraft, said edge forming the opening, and at least a hinge-side region of the door wing arranged at the first end of the bent articulated arm lies on an outer side of the aircraft.

8. The aircraft door according to claim 7, wherein, in the open position, the bent articulated arm moves the door wing away from the stop-side door frame, as a result of which the door wing can rotate freely about the first end of the articulated arm.

9. The aircraft door according to claim 1, further comprising:
a fitting which is arranged on the door frame on the stop side and has a receptacle; and
a sliding extension which is arranged on the door wing on the stop side and is configured to slide into the receptacle of the fitting during the closing of the aircraft door.

10. The aircraft door according to claim 9, wherein the sliding extension has a roller which is rotatable about a pivot point and the outer periphery of which corresponds to a shape of the receptacle of the fitting.

11. The aircraft door according to claim 1, wherein the lock comprises
a first locking element, which is fastened rotatably: to the hinge-side door frame, to the outer skin of the aircraft, to another primary structural element of the aircraft, said primary structural element being adjacent to the aircraft door, or to a combination thereof, and
a second locking element, which is articulated on the bent articulated arm between the first and second end of the articulated aim, and wherein the first locking element is coupled rotatably to the second locking element via a joint.

12. The aircraft door according to claim 11, wherein the lock is configured to move the joint between the first and second locking elements into a position in which the joint is at a distance from a connecting line which connects a pivot point of the first locking element on the hinge-side door frame to a pivot point of the second locking element on the bent articulated arm, wherein the position of the joint lies in the direction of the hinge-side door frame, and
wherein the aircraft door further comprises:
a stop for the joint, and wherein, in the spaced-apart position, the joint is not configured to move further towards the door frame.

13. The aircraft door according to claim 1, further comprising:
a seal which is arranged on an inner side of the aircraft along an outer edge of the door wing.

14. An aircraft door which, on the periphery, has a hinge side, an opposite stop side, and free sides lying in between, wherein the aircraft door comprises:
a door wing which is configured to close an opening in an outer skin of an aircraft;
a door frame which, at least in sections, surrounds the opening in the outer skin of the aircraft;
a bent articulated arm, which is arranged on the hinge side of the aircraft door, wherein a first end of the articulated arm is connected rotatably to the door wing and a second end of the articulated arm is connected rotatably to the door frame on the hinge side of the aircraft door;
a door stop which is attached on the stop side and is configured to hold the door wing in a direction substantially perpendicular to a main plane of the door wing and towards an outer side of the aircraft; and
a lock arranged exclusively on the hinge side of the aircraft door,
wherein the door stop has a first stop element arranged on the door frame on the stop side and a second stop element arranged on the door wing on the stop side,
wherein the first stop element has a first stop surface which runs obliquely into the aircraft interior in a direction from the stop-side door frame into the opening surrounded by the door frame, and
wherein the second stop element has a second stop surface which runs obliquely away from the aircraft interior in a direction away from the door wing when the aircraft door is closed,
wherein the first and second stop surface lie on each other in the closed state of the aircraft door.

15. An aircraft door which, on the periphery, has a hinge side, an opposite stop side, and free sides lying in between, wherein the aircraft door comprises:
a door wing which is configured to close an opening in an outer skin of an aircraft;
a door frame which, at least in sections, surrounds the opening in the outer skin of the aircraft;
a bent articulated arm, which is arranged on the hinge side of the aircraft door, wherein a first end of the articulated arm is connected rotatably to the door wing and a second end of the articulated arm is connected rotatably to the door frame on the hinge side of the aircraft door;
a door stop which is attached on the stop side and is configured to hold the door wing in a direction substantially perpendicular to a main plane of the door wing and towards an outer side of the aircraft;
a lock arranged exclusively on the hinge side of the aircraft door;
a fitting which is arranged on the door frame on the stop side and has a receptacle; and
a sliding extension which is arranged on the door wing on the stop side and is configured to slide into the receptacle of the fitting during the closing of the aircraft door.

* * * * *